United States Patent
Huang et al.

(10) Patent No.: US 8,659,808 B2
(45) Date of Patent: Feb. 25, 2014

(54) SCANNING APPARATUS

(75) Inventors: Kuan-Cheng Huang, New Taipei (TW); Yung-Kai Chen, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 241 days.

(21) Appl. No.: 13/315,449

(22) Filed: Dec. 9, 2011

(65) Prior Publication Data

US 2012/0236376 A1  Sep. 20, 2012

(30) Foreign Application Priority Data

Mar. 18, 2011 (TW) .............................. 100204877 U

(51) Int. Cl.
*H04N 1/46* (2006.01)
*H04N 1/40* (2006.01)
*H04N 1/04* (2006.01)

(52) U.S. Cl.
USPC ........... 358/505; 358/504; 358/406; 358/486; 358/488; 358/496; 358/474; 358/461

(58) Field of Classification Search
USPC ......... 358/461, 408, 496, 498, 474, 486, 406, 358/488, 504, 505; 399/367, 364, 374; 355/23, 24
See application file for complete search history.

(56) References Cited

U.S. PATENT DOCUMENTS

| | | | | |
|---|---|---|---|---|
| 5,790,211 A * | 8/1998 | Seachman et al. | ................ | 349/3 |
| 6,002,892 A * | 12/1999 | Takashimizu | .................. | 399/52 |
| 6,166,394 A * | 12/2000 | Rubscha | ................. | 250/559.42 |
| 6,198,088 B1 * | 3/2001 | Seachman | ................. | 250/208.1 |
| 6,219,158 B1 * | 4/2001 | Dawe | ............. | 358/509 |
| 6,327,058 B1 * | 12/2001 | Webb et al. | .................. | 358/497 |
| 6,587,233 B1 * | 7/2003 | Salgado | ....................... | 358/505 |
| 6,765,697 B2 * | 7/2004 | Toyoda et al. | ............... | 358/471 |
| 6,977,759 B2 * | 12/2005 | Kumagai et al. | ............ | 358/471 |
| 7,042,598 B2 * | 5/2006 | Payne | ..................... | 358/474 |
| 7,805,021 B2 * | 9/2010 | Yeoh et al. | .................... | 382/294 |
| 8,085,448 B2 * | 12/2011 | Kato et al. | .................... | 358/474 |
| 8,259,316 B2 * | 9/2012 | Yanagawase | ................ | 358/1.13 |
| 8,422,083 B2 * | 4/2013 | Liao et al. | .................... | 358/461 |

* cited by examiner

*Primary Examiner* — Cheukfan Lee
(74) *Attorney, Agent, or Firm* — WPAT, P.C.; Anthony King

(57) ABSTRACT

A duplex scanning apparatus capable of switching a scanning background includes a pair of glass plates, a pair of background boards pivoted to the glass plates and a driving mechanism. The glass plates are disposed in a frame and overlapped with each other. The two glass plates define two scanning areas face to face. A portion of the frame adjacent to an outer surface of the glass plate defines a first color area of the scanning background corresponding to the scanning area. One background board is positioned above one glass plate, and the other background board is positioned under the other glass plate and away from the one background board. Each background board defines a second color area of the scanning background corresponding to the scanning area. The driving mechanism mounted in the frame drives the background boards to turn over with respect to the corresponding glass plates.

8 Claims, 5 Drawing Sheets

SCANNING APPARATUS

BACKGROUND OF THE INVENTION

1. Field of the Invention

The present invention generally relates to a scanning apparatus, and more particularly to a scanning apparatus capable of switching a scanning background.

2. The Related Art

With fast development of technology, graphic processing tools, such as multi-functional peripherals and scanners, have been widely used in office activities by modern people. A conventional scanning apparatus is one of the most important parts of the graphic processing tool. Performance of the scanning apparatus directly affects performance of the graphic processing tool.

A duplex scanning process of the scanning apparatus is shown in FIG. 6. A scanning light 50 penetrates through a piece of paper 60 to shine on a white background board 70, and then is reflected back by the white background board 70 to increase brightness of a scanning image. However, when the paper is thinner in thickness and has a lighter color, boundaries of the paper are apt to become illegible, or the scanning image in a back of the paper easily permeates the paper to interfere with the scanning image in a front of the paper in the duplex scanning process. Thus, accuracy of the scanning apparatus is lowered that affects a normal working condition of the graphic processing tool.

SUMMARY OF THE INVENTION

An object of the present invention is to provide a scanning apparatus capable of switching a scanning background includes a pair of glass plates, a pair of background boards and a driving mechanism. The glass plates are disposed in a frame and overlapped with each other. Two aspectant surfaces of the two glass plates define two scanning areas face to face. A portion of the frame adjacent to an outer surface of the glass plate defines a first color area of the scanning background corresponding to the scanning area. The background boards are pivoted to the glass plates. One background board is positioned above one glass plate, and the other background board positioned under the other glass plate and away from the one background board. Each background board defines a second color area of the scanning background corresponding to the scanning area. The driving mechanism is mounted in the frame. The driving mechanism drives the background boards to turn over with respect to the corresponding glass plates so as to switch the scanning background between the first color area and the second color area.

As described above, the driving mechanism drives the background board to turn over with respect to the corresponding glass plates so as to switch the scanning background between the first color area or the second color area. Providing the proper scanning background for a scanning object is apt for the scanning apparatus to exactly distinguish the boundary of the scanning object and ensure the scanning images in the front and the back of the scanning object scanned legibly without any overlapping phenomena in a duplex scanning process. So that accuracy of the scanning apparatus is achieved to ensure a normal working condition of the scanning apparatus. Otherwise, simple structure of the scanning apparatus is beneficial for saving cost of the scanning apparatus.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
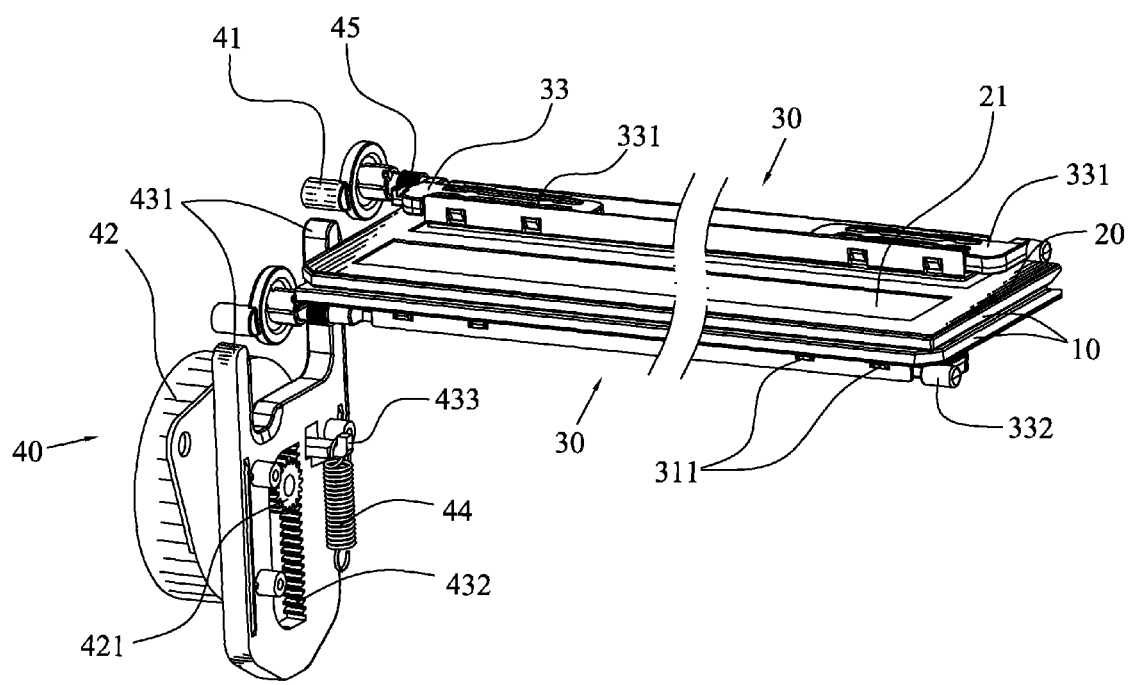
FIG. 1 is a perspective view of a scanning apparatus in accordance with the present invention.
Figure 3:
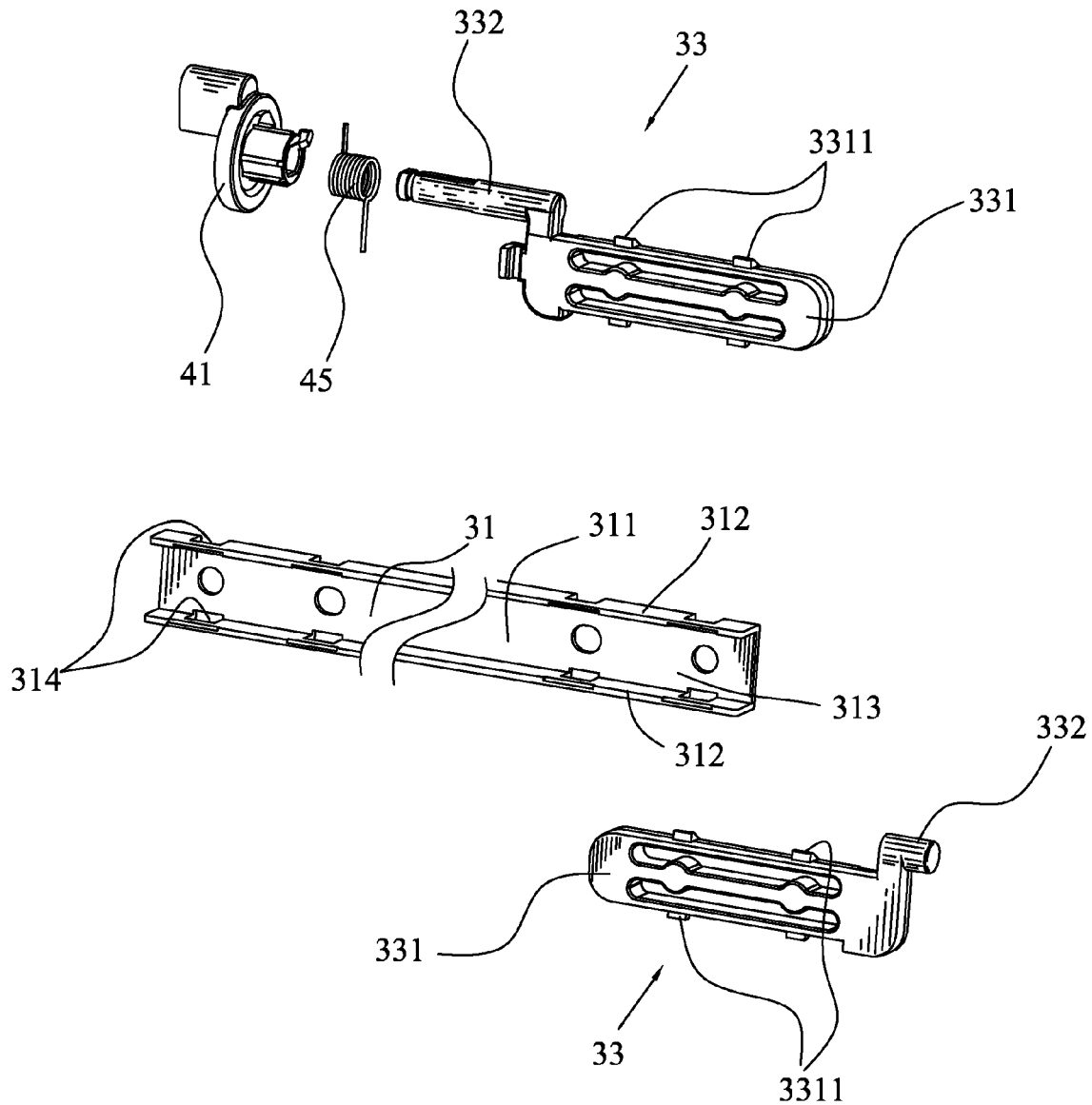
FIG. 3 is a partially enlarged view of the scanning apparatus of FIG. 1.

With reference to FIG. 1 and FIG. 3, a scanning apparatus which is used in a scanner (not shown) or a multi-functional peripheral (not shown) in accordance with the present invention is shown. The scanning apparatus capable of switching a scanning background includes a frame (not shown), a pair of glass plates 10, two window adhesive pieces 20, a pair of background boards 30 and a driving mechanism 40.

Figure 2:
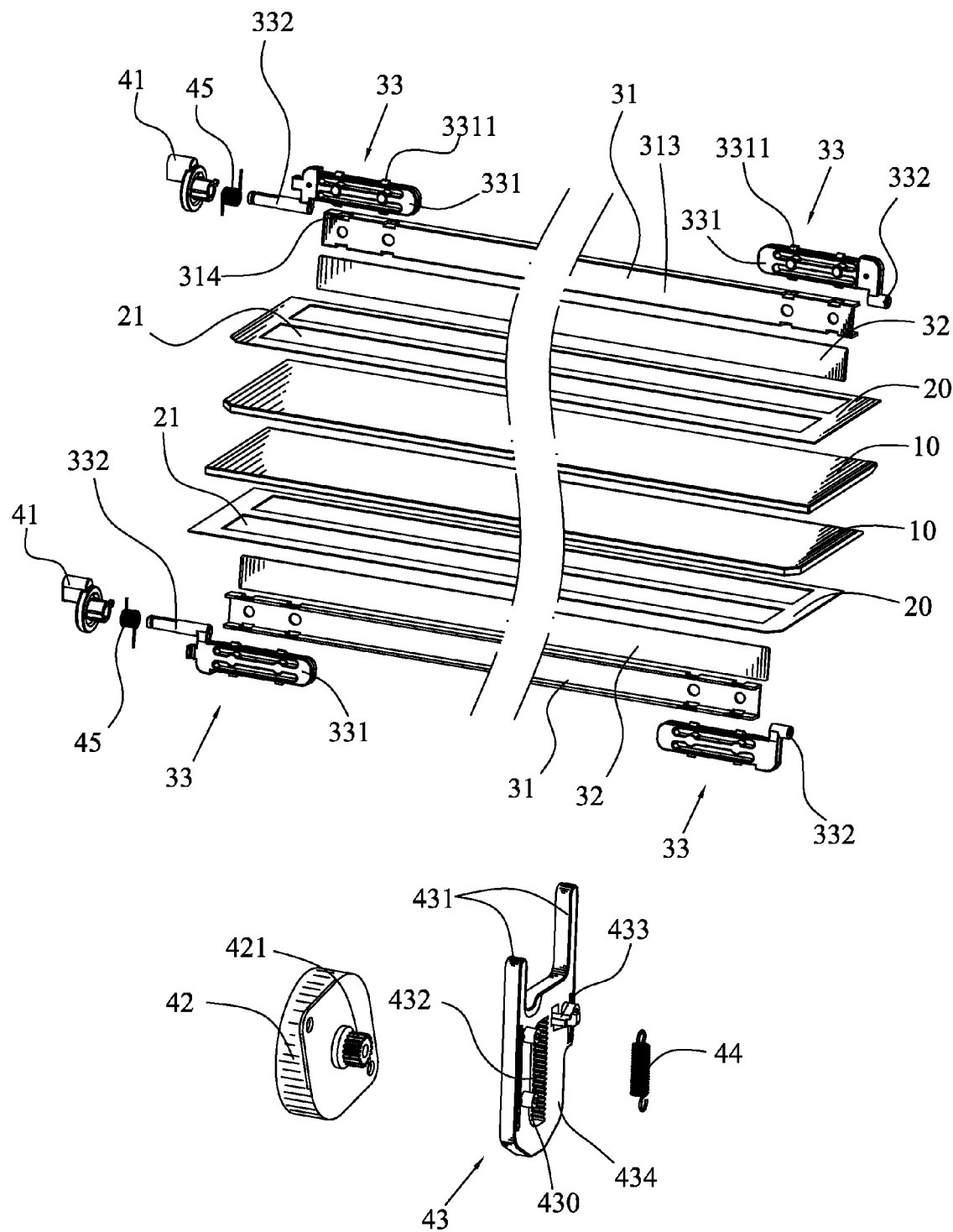
FIG. 2 is an exploded view of the scanning apparatus of FIG. 1.

Referring to FIG. 1 and FIG. 2, the pair of the glass plates 10 of rectangular shape are disposed in the frame and overlapped with each other. Two aspectant surfaces of the two glass plates 10 define two scanning areas (not labeled) face to face. A scanning object is positioned between the two scanning areas of the two glass plates 10. The two window adhesive pieces 20 are disposed on two opposite outer surfaces of the two glass plates 10, respectively. Two sides of each window adhesive piece 20 define two rectangular windows 21 spaced from each other for limiting a scanning scope of the scanning apparatus. A scanning routine penetrates through the windows 21 and the glass plate 10 vertically. A portion of the frame adjacent to the outer surface of the glass plate 10 absorbs optical fibers. An inside of the portion of the frame adjacent to the outer surface of the glass plate 10 is designed as a first color area of the scanning background corresponding to the scanning area.

Referring to FIG. 2 and FIG. 3, the pair of the background boards 30 are pivoted to the glass plates 10. One background board 30 is positioned above one window 21 of one window adhesive piece 20, and the other background board 30 is positioned under one window 21 of the other window adhesive piece 20 and away from the one background board 30. Each background board 30 includes a fastening board 31, a white base board 32 and two motive pivoting elements 33. The fastening board 31 has a main board 311, and two side walls 312 extending upward from two opposite sides of the main board 311. A receiving space 313 is formed among the main board 311 and the two side walls 312. Two bottoms of a front end and a rear end of each side wall 312 respectively define two buckling grooves 314. The motive pivoting element 33 includes a fastening portion 331, and an inverted L-shaped motive axle 332 connected with one end of one side surface of the fastening portion 331. Each side surface of the fastening portion 331 defines two buckling portions 3311. The white base board 32 is mounted to the fastening board 31 and designed as a second color area of the scanning background corresponding to the scanning area. The fastening portion 331 is received in the receiving space 313 with the buckling portions 3311 buckled in the buckling grooves 314.

Referring to FIG. 1 and FIG. 2, the driving mechanism 40 is positioned perpendicular to the background board 30 and under the background board 30. The driving mechanism 40 drives the background boards 30 to turn over with respect to the corresponding glass plates 10 so as to switch the scanning background between the first color area and the second color area. The driving mechanism 40 includes two switching elements 41, a motor 42, a driving element 43, a restoration spring 44 and a torsion spring 45. The motor 42 has a gear portion 421 protruded from a middle of a front of the motor 42. The driving element 43 includes a base body 434. Two opposite ends of a top of the base body 434 extend upward to form two pushing portions 431. A middle of the base body 434 is cut off to define an opening 430. One inner side of the opening 430 defines a plurality of teeth 432. A hooking portion 433 is protruded forward from a front of the base body 434 and adjacent to the teeth 432.

The torsion spring 45 is looped around the motive axle 332 of the motive pivoting element 33, and clamped between the motive pivoting element 33 of the background board 30 and the glass plate 10 to pivot the background board 30 to the glass plate 10. The background board 30 is overturned around the motive axle 332 to cover up the window 21 or open the window 21 freely. The switching element 41 is mounted around an outer end of the motive axle 332 of the motive pivoting element 33 which is located in a rear of the receiving space 313. A rear of the motor 42 is mounted to the frame. The gear portion 421 is engaged with the teeth 432 to mount the front of the motor 42 to a rear of the driving element 43. The restoration spring 44 is mounted between the hooking portion 433 and the frame.

Figure 5:
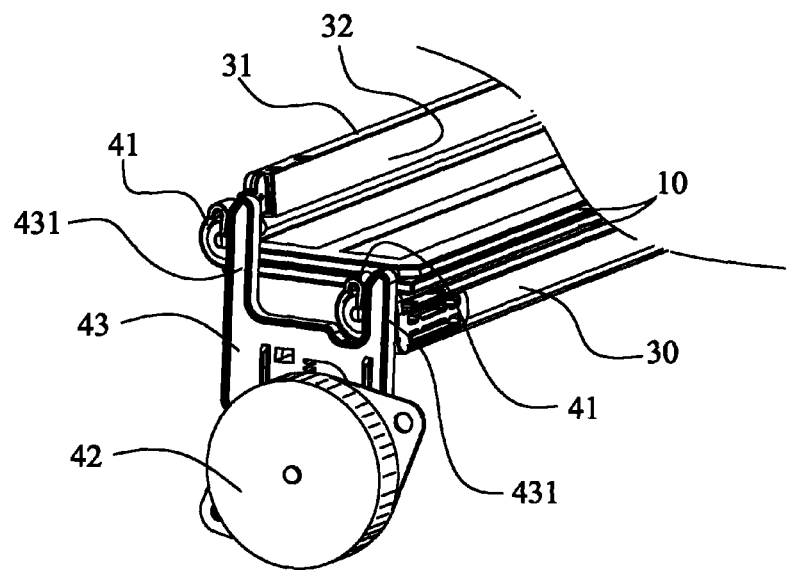
FIG. 5 is another side view of the scanning apparatus of FIG. 1, wherein another scanning background is provided.
Figure 6:
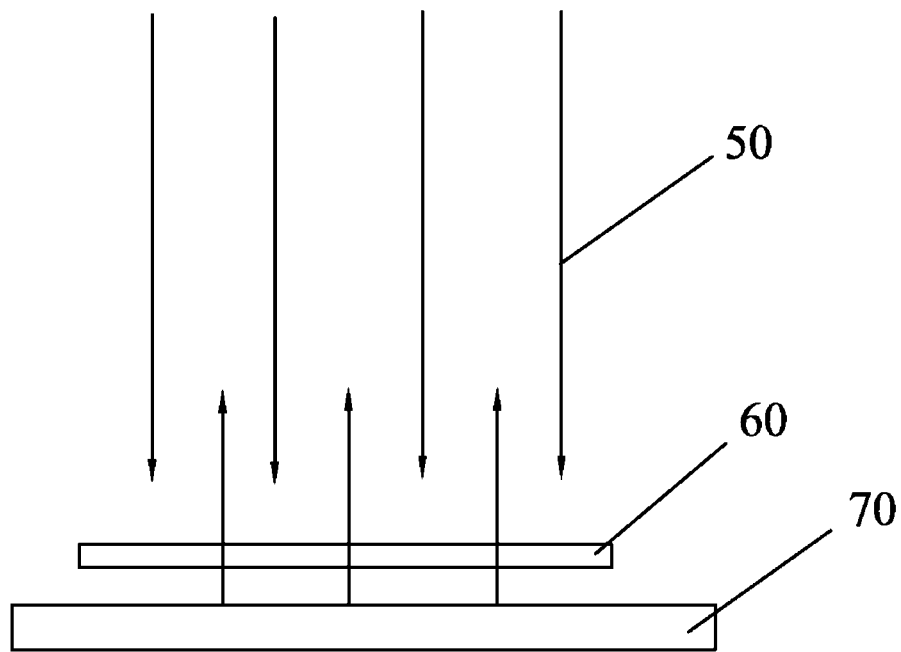
FIG. 6 is a view showing a duplex scanning process of a conventional scanning apparatus.

Referring to FIG. 2 and FIG. 5, the motor 42 is started to drive the gear portion 421 to roll along a counter-clockwise direction to push the base body 434 of the driving element 43 to move upward so as to make the two pushing portions 431 resist against two bottoms of the two rear ends of the two switching elements 41 to push the background board 30 to turn over around the motive axle 332. The restoration spring 44 shows a stretching status, and the torsion spring 45 twists an angle. When the white base board 32 is parallel to the scanning routine, the windows 21 are completely opened. At that case, the first color area is provided as the scanning background. The first color area is a dark environment that generates an obvious boundary comparison at the time of processing scanning objects with light color, so the light color scanning objects are apt to be distinguished by the scanning apparatus. Moreover, there is no light reflected by the background board 30, scanning images in a back and a front of the scanning object are scanned legibly in a duplex scanning process.

Figure 4:
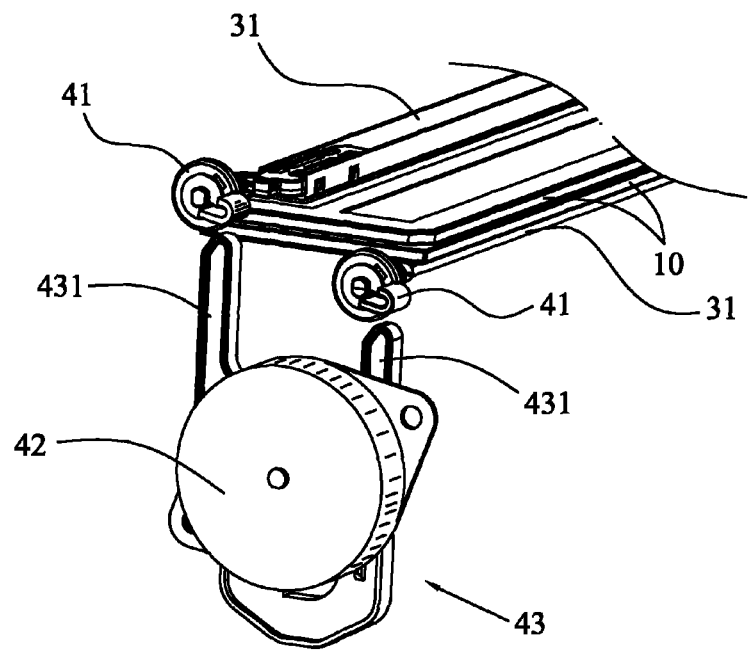
FIG. 4 is a side view of the scanning apparatus of FIG. 1, wherein a scanning background is provided.

Referring to FIG. 2 and FIG. 4, the motor 42 is stopped, the restoration spring 44 returns back to pull the driving element 43 to an original position. The two pushing portions 431 are apart away from the two rear ends of the two switching elements 41. The torsion spring 45 restores to an original status to drive the background board 30 to turn over towards the windows 21 to cover up the windows 21. At this moment, the white base board 32 as the second color area of the scanning background is provided for the scanning object.

As described above, the driving mechanism 40 drives the background boards 30 to turn over with respect to the corresponding glass plates 10 so as to switch the scanning background between the first color area or the second color area. Providing the proper scanning background for the scanning object is apt for the scanning apparatus to exactly distinguish the boundary of the scanning object and ensure the scanning images in the front and the back of the scanning object scanned legibly without any overlapping phenomena in the duplex scanning process. So that accuracy of the scanning apparatus is achieved to ensure a normal working condition of the scanning apparatus. Otherwise, simple structure of the scanning apparatus is beneficial for saving cost of the scanning apparatus.

What is claimed is:

1. A scanning apparatus capable of switching a scanning background, comprising:
    a pair of glass plates disposed in a frame and overlapped with each other, two aspectant surfaces of the two glass plates defining two scanning areas face to face, a portion of the frame adjacent to an outer surface of the glass plate defining a first color area of the scanning background corresponding to the scanning area;
    a pair of background boards pivoted to the glass plates, one background board being positioned above one glass plate, and the other background board being positioned under the other glass plate and away from the one background board, each background board defining a second color area of the scanning background corresponding to the scanning area; and
    a driving mechanism mounted in the frame, the driving mechanism driving the background boards to turn over with respect to the corresponding glass plates so as to switch the scanning background between the first color area and the second color area.

2. The scanning apparatus as claimed in claim 1, wherein an inside of the portion of the frame adjacent to the outer surface of the glass plate is designed as the first color area of the scanning background.

3. The scanning apparatus as claimed in claim 1, wherein the background board includes a fastening board, and a white base board mounted to the fastening board and designed as the second color area of the scanning background.

4. The scanning apparatus as claimed in claim 3, wherein the background board further includes a motive pivoting element mounted in the fastening board, the motive pivoting element has a motive axle connected with one side surface thereof, the driving mechanism includes two switching elements, a motor, a driving element, a restoration spring and a torsion spring, the motor has a gear portion protruded from a front thereof, a middle of the driving element is cut off to define an opening, an inner side of the opening defines a plurality of teeth, the torsion spring is looped around the motive axle, and clamped between the motive pivoting element and the glass plate, the switching element is mounted around an outer end of the motive axle, the motor is mounted between the frame and the driving element with the gear portion engaged with the teeth, the restoration spring is mounted between the driving element and the frame.

5. The scanning apparatus as claimed in claim 4, wherein two opposite ends of a top of the driving element extend upward to form two pushing portions resisting against two rear ends of the two switching elements or apart away from the two rear ends of the two switching elements in the process of the motor driving the gear portion to roll to push the driving element upward or the restoration spring pulling the driving element to an original position.

6. The scanning apparatus as claimed in claim 4, wherein a hooking portion is protruded forward from a front of the driving element, the restoration spring is mounted between the hooking portion and the frame.

7. The scanning apparatus as claimed in claim 4, wherein each side surface of the motive pivoting element defines two buckling portions, two opposite ends of each side of the fastening board define two buckling grooves for buckling the buckling portions therein.

8. The scanning apparatus as claimed in claim 1, further comprising two window adhesive pieces disposed on two opposite outer surfaces of the two glass plates, respectively, each window adhesive piece defining two windows, the one background board being positioned above one window of one window adhesive piece, and the other background board being positioned under one window of the other window adhesive piece and away from the one background board.

* * * * *